United States Patent
Gupta et al.

(10) Patent No.: US 11,128,383 B2
(45) Date of Patent: Sep. 21, 2021

(54) RECEIVER OF COHERENT OPTICAL COMMUNICATION LINK AND METHOD OF COMPENSATING CARRIER PHASE OFFSET IN RECEIVER

(71) Applicant: Indian Institute of Technology Bombay, Mumbai (IN)

(72) Inventors: Shalabh Gupta, Mumbai (IN); Rakesh Ashok, Bangalore (IN)

(73) Assignee: Indian Institute of Technology Bombay, Mumbai (IN)

(*) Notice: Subject to any disclaimer, the term of this patent is extended or adjusted under 35 U.S.C. 154(b) by 0 days.

(21) Appl. No.: 16/681,977

(22) Filed: Nov. 13, 2019

(65) Prior Publication Data

US 2020/0153513 A1 May 14, 2020

(30) Foreign Application Priority Data

Nov. 13, 2018 (IN) .............................. 201821042617

(51) Int. Cl.
*H04B 10/61* (2013.01)
*H04L 7/00* (2006.01)
*G02F 1/01* (2006.01)

(52) U.S. Cl.
CPC ....... *H04B 10/6164* (2013.01); *H04B 10/613* (2013.01); *H04B 10/6165* (2013.01); *H04L 7/0075* (2013.01); *G02F 1/0147* (2013.01)

(58) Field of Classification Search
CPC .......................... H04B 10/6164; H04B 10/6165
See application file for complete search history.

(56) References Cited

U.S. PATENT DOCUMENTS

| 7,085,501 B1* | 8/2006 | Rickard | H04B 10/65 398/202 |
| 2004/0160661 A1* | 8/2004 | Hurrell | G02F 2/002 359/325 |

(Continued)

OTHER PUBLICATIONS

T. Liu, "A 2.7-V Dual-Frequency Single-Sideband Mixer", Symposium on VLSI Circuits Digest of Technical Papers, IEEE, 1998 (Year: 1998).*

(Continued)

*Primary Examiner* — Shi K Li

(57) ABSTRACT

Embodiments herein disclose receiver of coherent optical communication link and method of compensating carrier phase offset in receiver. 90° optical hybrid is configured to receive input of reference optical carrier (LO) signal and modulated optical signal (S) and carrier phase offset detection block is configured to generate output signal representing average of the phase offset at the input of the carrier phase offset detection block. Electronic control unit configured to receive output signals from the carrier phase offset detection block for generating control signals and tunable phase delay block configured to receive the control signals from the electronic control unit. 90° optical hybrid, carrier phase offset detection block, electronic control unit and the tunable phase delay block are configured in feedback loop, such that outputs of the carrier phase offset detection block are used for tuning the phase delay of the tunable phase delay block to achieve carrier phase synchronization.

19 Claims, 12 Drawing Sheets

(56) References Cited

U.S. PATENT DOCUMENTS

| | | | | |
|---|---|---|---|---|
| 2010/0098438 | A1* | 4/2010 | Prat Goma | H04B 10/63 |
| | | | | 398/203 |
| 2011/0150495 | A1* | 6/2011 | Nosaka | H03H 11/20 |
| | | | | 398/135 |
| 2012/0057884 | A1* | 3/2012 | Zhao | H04B 10/69 |
| | | | | 398/209 |
| 2016/0301193 | A1* | 10/2016 | Itoh | H01S 5/4012 |
| 2017/0294967 | A1* | 10/2017 | Schmogrow | H04B 10/50575 |
| 2018/0323771 | A1* | 11/2018 | Maruyama | H03F 3/211 |
| 2019/0223805 | A1* | 7/2019 | Maierhofer | A61B 5/746 |
| 2019/0391243 | A1* | 12/2019 | Nicolaescu | G01S 7/4817 |

OTHER PUBLICATIONS

Noe et al., "Integrated-Optica Rotating Waveplate Frequency Shifter", Electronics Letters vol. 24, No. 21, Oct. 1988 (Year: 1988).*

Imai et al., "One-Chip Endless Phase Shifter IC's for Space Diversity Combiner", IEEE Transactions on Circuit and System, vol. 43, No. 4, Apr. 1996 (Year: 1996).*

ECE65 Lecture Notes (F. Najmabadi), Spring 2006 (Year: 2006).*

* cited by examiner

RECEIVER OF COHERENT OPTICAL COMMUNICATION LINK AND METHOD OF COMPENSATING CARRIER PHASE OFFSET IN RECEIVER

FIELD OF INVENTION

The present disclosure relates to low power coherent optical interconnects, more particularly to, carrier phase recovery and compensation in coherent optical links. The present application is based on, and claims priority from an Indian Application Number 201821042617 filed on 13 Nov. 2018, the disclosure of which is hereby incorporated by reference herein.

BACKGROUND OF INVENTION

Demand for low power high-speed short-reach datacenter interconnects is growing very rapidly. Intensity-modulation direct-detection (IMDD) schemes such as PAM-4 are able achieve low power optical interconnects. However, due to bandwidth limitations of electronics, and dispersion effects, achieving more than 100 Gbps per wavelength channel using IMDD techniques become difficult.

For higher capacities, coherent optical communication links have to be used due to significant additional power consumption overheads as the coherent optical communication links require significant power for high-speed ADC (analog-to-digital conversion) and DSP (digital-signal processing). DSP is required for carrier frequency and phase offset correction and for mitigation of other effects such as dispersion effects.

Efforts and proposals have been made to obviate the requirement of high-power consuming high-speed ADCs and DSP to reduce power consumption substantially in such interconnects, especially for carrier phase/frequency recovery and compensation (CPRC).

For example, previously, CPRC for BPSK signals using a Costas loop has been demonstrated. However, for such a system, a very specific type of laser is needed, requiring very fast tunability. Such lasers also have poor phase-noise characteristics. Thus, use of such lasers makes the communication link expensive, and results in high bit-error-rates (BERs) in the link.

Also, for higher data rates advanced modulation formats, such as QPSK, 8-PSK, 16-PSK, 8-QAM, 16-QAM, 32-QAM, 64-QAM have to be used, for which CPRC solutions are not easy to implement.

OBJECT OF INVENTION

The principal object of the embodiments herein is to provide receiver of a coherent optical communication link.

Yet another object of the embodiment is a method of tuning phase delay in the receiver.

Yet another object of the embodiment is to provide a power efficient technique for CPRC in coherent links for QPSK, 16-QAM or similar systems.

SUMMARY

Accordingly, the embodiments herein provide a receiver of a coherent optical communication link. The receiver comprises of a 90° optical hybrid configured to receive as an input, a reference optical carrier (LO) signal and a modulated optical signal (S) and a carrier phase offset detection block configured to generate at least one output representing a nominal phase offset between the reference optical carrier (LO) and the modulated optical signal (S) and an electronic control unit configured to receive one or more output signals from the carrier phase offset detection block for generating one or more control signals. The receiver further comprises a tunable phase delay block configured to receive the one or more control signals from the electronic control unit. Each of the 90° optical hybrid, the carrier phase offset detection block, the electronic control unit and the tunable phase delay block are configured in a feedback loop such that one or more outputs of the carrier phase offset detection block are used for tuning the phase delay of the tunable phase delay block to achieve carrier phase synchronization.

Accordingly, the embodiments herein provide a method of compensating for a carrier phase offset in a receiver of a coherent optical communication link. The method comprises of receiving, at a 90° optical hybrid, an input of each of a reference optical carrier (LO) signal and a modulated optical signal (S) and generating, through a carrier phase offset detection block, at least one output representing a nominal phase offset between the reference optical carrier (LO) and the modulated optical signal (S). The method comprises of receiving, through an electronic control unit, one or more output signals from the carrier phase offset detection block for generating one or more control signals and receiving, at a tunable phase delay block, the one or more control signals from the electronic control unit. Each of the 90° optical hybrid, the carrier phase offset detection block, the electronic control unit and the tunable phase delay block are configured in a feedback loop, such that one or more outputs of the carrier phase offset detection block are used for tuning the phase delay of the tunable phase delay block to achieve carrier phase synchronization.

Accordingly, the embodiments herein also provide an endless tunable phase delay element comprising an optical IQ modulator, configured to receive an optical signal as an input and pass as an output a modified optical signal, after adding an endless tunable phase delay to the optical input signal. The optical IQ modulator receives at least two electrical control signals to control the endless tunable phase delay added by the optical IQ modulator. Each of the at least two electrical control signals are generated by an electronic circuitry connected to the optical IQ modulator and the at least two electrical control signals are generated by using one or more lookup tables from one of an input signal received by the electronic circuitry or an electrical signal obtained after integrating the input signal received by the electronic circuitry.

Accordingly, embodiments herein also provide a method of adding an endless tunable phase delay to an optical signal. The method comprises of coupling, an optical input signal to an optical input port of an optical IQ modulator, passing as an output a modified optical signal, after adding an endless tunable phase delay to the optical input signal and applying, by using an electronic circuitry, at least two electrical control signals to electrical inputs of the optical IQ modulator along with the optical input signal. The at least two electrical control signals are generated by using one or more lookup tables from one of an input signal received by the electronic circuitry or an electrical signal obtained after integrating the input signal received by the electronic circuitry.

BRIEF DESCRIPTION OF FIGURES

This receiver and method are illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein discuss a receiver implementing method for carrier phase recovery and compensation technique for low power coherent optical interconnects.

Figure 1:
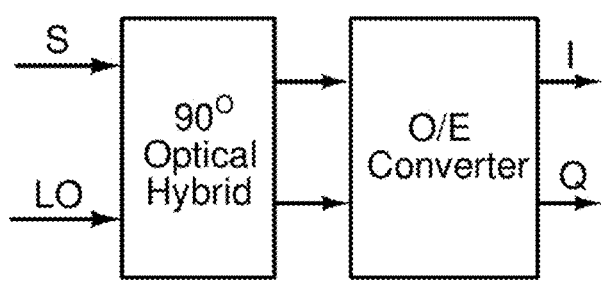
FIG. 1 illustrates a Coherent receiver frontend with 90° optical hybrid and O/E converters.

As shown in FIG. 1, in a coherent optical link, a receiver frontend uses the Local Oscillator (LO) i.e. the reference optical carrier, to demodulate message signal from the modulated optical signal (S), i.e. from the reference optical carrier modulated with the message signal, using a 90° optical hybrid and optical to electrical (O/E) converters (comprising photodetectors and optionally transimpedance amplifiers).

The reference optical carrier will now be referred as LO signal and the optical carrier modulated with message signal will be referred as S signal or "modulated optical signal." An input signal pair shown in the FIG. 1 at the input of the O/E converter and the I & Q signal pair shown at the output of the O/E converter may independently be single ended or differential. Similarly, various signals shown as inputs or outputs may be single ended or differential in different embodiments. The I-Q pair represents demodulated signal (in raw form) and may also be termed as the complex demodulated signal (I+jQ).

The receiver refers to a Coherent receiver frontend with the 90° optical hybrid and optical-to-electrical (O/E) converters. The receiver also comprises Local Oscillator (LO) or the reference optical carrier for providing the input of the reference optical carrier (LO) signal and the modulated optical signal (S—Signal referring to an optical carrier modulated with the message signal). Complex demodulated signal is represented by the I-Q pair (i.e. the complex signal I+jQ).

The electric field of the reference optical carrier at the input of the 90° optical hybrid with an amplitude $A_{LO}$, frequency $f_{LO}$, undesired time varying phase $\phi_{n,LO}(t)$ is represented by $E_{LO}=A_{LO}\exp(j(2\pi f_{LO}t+\phi_{n,LO}(t))$, where t represents time. The electric field of the modulated optical signal with amplitude $A_S$, optical carrier frequency $f_c$, time varying message phase $\phi_m(t)$ and undesired time varying phase $\phi_{n,c}(t)$ is represented by $E_S=A_S\exp(j(2\pi f_c t+\phi_m(t)+\phi_{n,c}(t))$.

The expressions for normalized electrical signals at output of O/E converter are given by: $I=A_S\cdot\cos(2\pi(f_c-f_{LO})t+\phi_m(t)+\phi_{n,c}(t)-\phi_{n,LO}(t))$ and $Q=A_S\sin(2\pi(f_c-f_{LO})t+\phi_m(t)+\phi_{n,c}(t)-\phi_{n,LO}(t))$. The term $f_c-f_{LO}$, which quantifies the difference between the average carrier frequency of the modulated optical signal and that of the reference optical carrier at the optical hybrid input, is termed as the carrier frequency offset in the coherent optical communication link.

Similarly, the term $\phi_{n,c}(t)-\phi_{n,LO}(t)$, which quantifies the phase difference between the carrier phase of the modulated optical signal and that of the reference optical carrier at the optical hybrid input, is termed as the carrier phase offset in the coherent optical communication link. Since phase and frequency are related, i.e. frequency offset is a time derivative of frequency, the overall phase offset can be written as:

$$\phi_{offset,overall}=\int 2\pi(f_c-f_{LO})\cdot dt+\phi_{n,c}(t)-\phi_{n,LO}(t)$$

At least one of a non-zero phase and frequency offset exists between nominal phases and frequencies of each of the signal S and the signal LO. Frequency offset generally exists if the transmitter uses one laser source and the receiver uses another independent laser source. If the signal S and the signal LO are derived from a common laser source, then nominal (or average) frequency offset is zero, and only a phase offset exists. The phase offset may be time-varying due to phase-noise in the laser and fluctuations in the phase delays in the signal S and signal LO paths. An instantaneous non-zero frequency offset $f_{offset}(t)$ still exists, and is proportional to a time derivative of an instantaneous phase offset $\phi_{offset}(t)$, at time instant t, and may be written as:

$$f_{offset}(t)=\frac{1}{2\pi}\frac{d\phi_{offset}(t)}{dt} \quad \text{Equation (1)}$$

Therefore, according to equation (1), the frequency offset and phase offset are inter related and compensation of one of the frequency offset or the phase offset may result in compensation of the one of the phase offset or the frequency offset. For example, if there is a non-zero nominal frequency offset, the nominal frequency offset may be compensated by adding a continuously increasing phase offset in between the signal S and the signal LO paths. If there is a nominal phase offset, the nominal phase offset may be removed by momentarily adding a frequency offset for a short time period between the signal S and the signal LO paths.

Figures 2A, 2B, 2C:
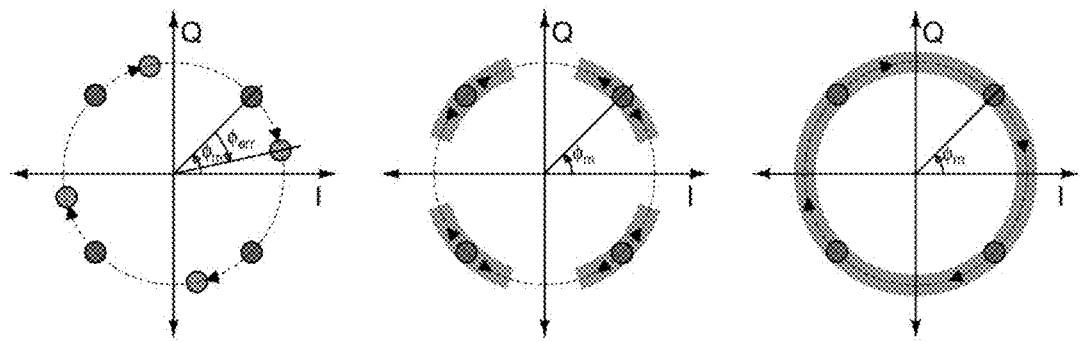
FIG. 2(a) shows variation of constellation points for QPSK modulation format due to finite phase offset.
FIG. 2(b) shows spread of constellation points for QPSK modulation format due to non-zero laser linewidths.
FIG. 2(c) shows continuous rotation of constellation points of QPSK modulation format due to constant and time varying frequency offsets between the lasers.

In accordance with an exemplary embodiment, FIG. 2(a), FIG. 2(b) and FIG. 2(c) shows variation of constellation points for QPSK modulation format due to laser phase and frequency offsets and linewidths. FIG. 2(a) shows shift in the constellation points due to finite phase offset, FIG. 2(b) shows spread of constellation points due to non-zero laser linewidths and FIG. 2(c) shows continuous rotation of constellation points due to constant and time varying frequency offsets between the lasers.

When digital modulation formats comprising an M-ary Phase Shift Keying (M-PSK) or N-ary Quadrature Amplitude Modulation (N-QAM) are used, the message signal is represented by digital symbols, and the symbols are mapped to the constellation points on the complex plane (showing raw I-Q values of the demodulation message signal).

The time varying phase and frequency offsets between the lasers result in phase shift of the constellation points on the complex (I-Q) plane (as shown in FIG. 2(a), spread of constellation points (as shown in FIG. 2(b), or continuous rotation of the constellation points (as shown in FIG. 2(c). In order to prevent at least one of the phase shift, spread and continuous rotation of the constellation points, the phase offset and the frequency offsets between the signal S and the signal LO have to be removed or compensated for.

Phase and frequency offset compensation is performed by introducing at least one of the phase delay and frequency shift in the S signal and the LO signal path so that an overall phase offset between the S signal and the LO signal is nullified. Process of introducing at least one of the phase delay and frequency shift is known as carrier phase recovery and compensation (or carrier phase synchronization). Proposed receiver and the method 200 solve problem of phase shift by using power efficient techniques. At least one of the phase compensation and the frequency compensation may be done in at least one of an optical domain and electrical domain. When the least one of the phase compensation and the frequency compensation is compensated in the electrical domain, the phase delay is actually added after the 90° optical hybrid and conversion of the optical signals to electrical domain.

Figure 3:
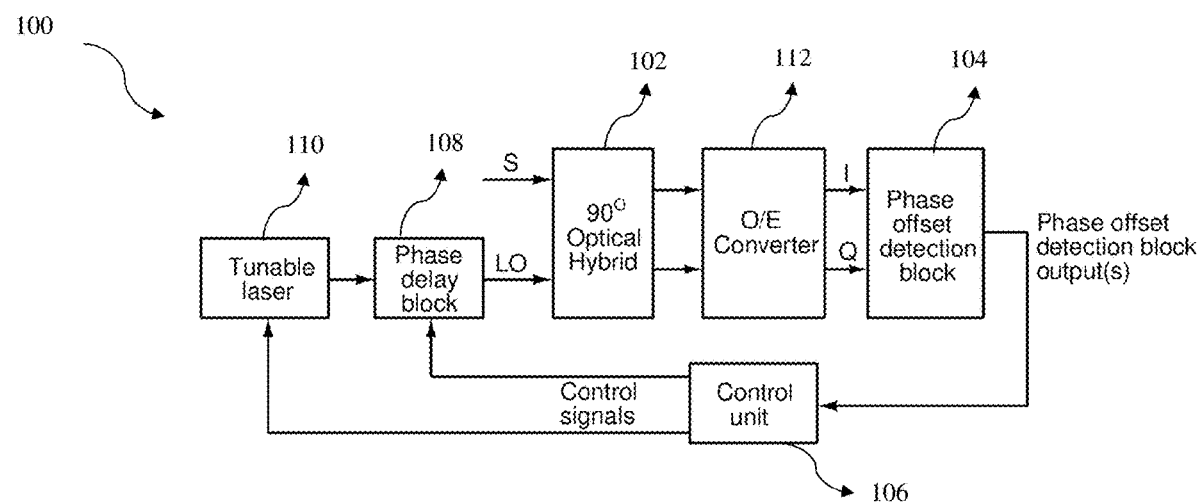
FIG. 3 illustrates configuration of a receiver of a coherent optical communication link, according to embodiments as disclosed herein.

In accordance with an embodiment, referring to FIG. 3, proposed receiver 100 of a coherent optical communication link is shown. The receiver 100 comprises of a 90° optical hybrid 102 configured to receive an input of a reference optical carrier (LO) signal and a modulated optical signal (S). The receiver 100 further comprises a carrier phase offset detection block 104 configured to generate at least one output representing a nominal phase offset between the reference optical carrier (LO) and the modulated optical signal (S).

The receiver 100 further comprises an electronic control unit 106 configured to receive one or more output signals from the carrier phase offset detection block 104 for generating one or more control signals. The receiver 100 further comprises a tunable phase delay block 108 configured to receive the one or more control signals from the electronic control unit 106.

In the receiver 100, each of the 90° optical hybrid 102, the carrier phase offset detection block 104, the electronic control unit 106 and the tunable phase delay block 108 are configured in a feedback loop such that one or more outputs of the carrier phase offset detection block 104 are used for tuning the phase delay of the tunable phase delay block 108 to achieve carrier phase synchronization.

Figure 4:
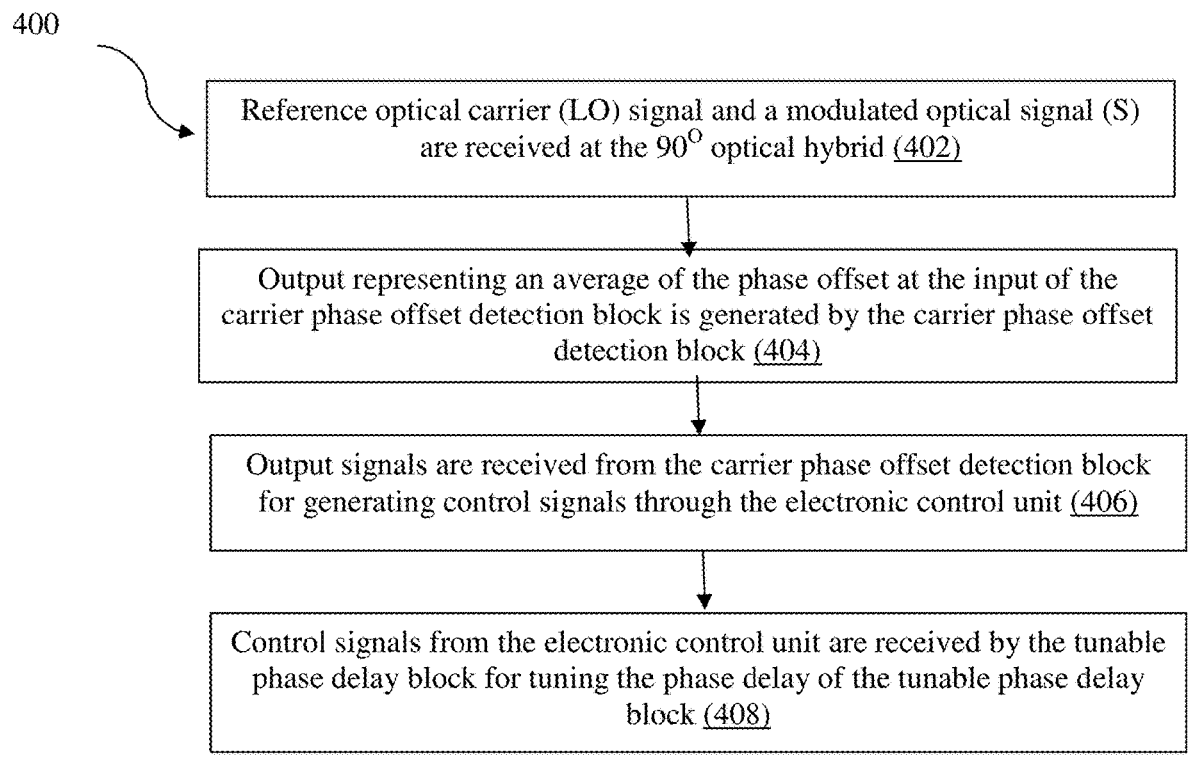
FIG. 4 illustrates a method for tuning phase delay in receiver of a coherent optical communication link, according to embodiments as disclosed herein.

In accordance with an alternate embodiment, referring to FIG. 4, a flow chart for a method 400 of compensating for a carrier phase offset in the receiver 100 of the coherent optical communication link is shown.

At step 402, the method 400 receives an input of each of the reference optical carrier (LO) signal and a modulated optical signal (S) at the 90° optical hybrid 102. At step 404, the method 400 generates at least one output representing a nominal phase offset between the reference optical carrier (LO) and the modulated optical signal (S) through the carrier phase offset detection block 104.

At step 406, the method 400 receives one or more output signals from the carrier phase offset detection block 104 for generating one or more control signals through the electronic control unit. At step 408, the method 200 receives the one or more control signals from the electronic control unit 106 at the tunable phase delay block 108. In the proposed method 400, each of the 90° optical hybrid 102, the carrier phase offset detection block 104, the electronic control unit 106 and the tunable phase delay block 108 are configured in a feedback loop, such that one or more outputs of the carrier phase offset detection block 104 are used for tuning the phase delay of the tunable phase delay block 108 to achieve carrier phase synchronization.

Still referring to FIG. 1 and FIG. 2 in combination, the phase offset detection block 104 configured in the feedback loop of the receiver 100 produces an output dependent on the phase offset present at the input of the carrier phase offset detection block. In a predefined range of the phase offset, when an average magnitude of the output changes monotonically with the magnitude of the phase offset between the S signal and the LO signal, the output of the phase offset detection block 104 may be termed as a phase error signal.

The phase offset detection block 104 may produce second output signal. In another predefined range of the frequency offset between the signal S and the signal LO, when the average magnitude of the second output changes monotonically with the magnitude of the frequency offset between the signal S and the signal LO, the second output signal is termed as a frequency error signal.

Figure 5:
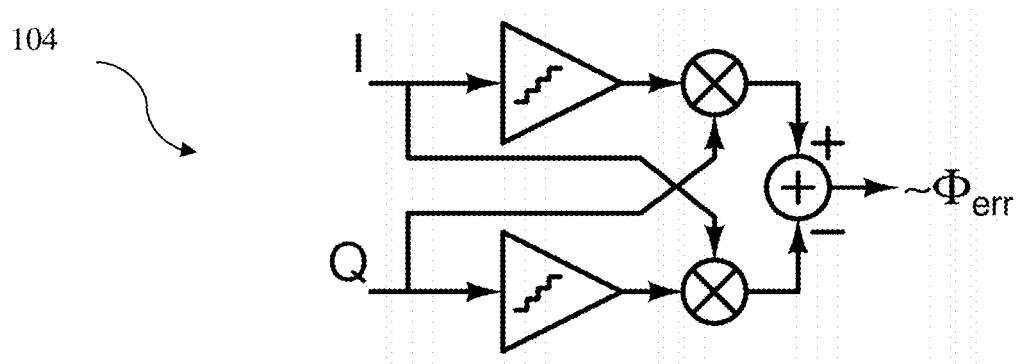
FIG. 5 shows phase detection block in the receiver with cross correlator for M-PSK, and N-QAM, where M is 2, 4, 8 or 16 and N is 4, 8, 16, 32 or 64, according to embodiments as disclosed herein.

In an embodiment, the phase offset detection block 104 may be implemented by at least one of using a combination of photonic components and electronic components comprising one of couplers, photodetectors, modulator, or using purely electronic components comprising mosfets on electronic integrated circuit (EIC). In optical domain, the phase offset detection block 104 may be implemented by using one of couplers, modulators, and photodetectors. In an Analog domain implementation, the phase detection block 104 may be implemented in an EIC by using cross-correlator architecture. One embodiment of the cross-correlator based phase detector (phase detection clock 104) is shown in FIG. 5. FIG. 5 shows the phase detection block with cross-correlated architecture for M-PSK, and N-QAM, where M is 2, 4, 8 or 16 and N is 4, 8, 16, 32 or 64.

In FIG. 5, the cross-correlator comprises two-level or multi-level quantizers, multipliers, and an adder block. The number of levels of quantizer and the quantization thresholds depend on the modulation formats being used.

The phase error signal coming out of the phase detection block 104 in the analog domain will be a monotonically varying function of the phase offset between the S signal and the LO signal, at least when the phase offset comprises in a range of −0.1 radian to +0.1 radian, for signals using a few commonly used modulation formats, such as for M-PSK, and N-QAM, where M is 2, 4, 8 or 16 and N is 4, 8, 16, 32 or 64.

The phase offset detection block 104 may also be implemented in an EIC the digital domain implementation using algorithms such as Viterbi-Viterbi, blind-phase search or look-up table-based algorithms.

The frequency error signal changes monotonically with the frequency offset between the S signal and the LO signals, at least when the frequency offset is in the range of −10 MHz to +10 MHz.

The electronic control unit 106 of the receiver 100 is configured to generate the control signals (details described later).

The receiver 100 further comprises the phase delay block (tunable phase delay block) 108. The tunable phase delay block 108 introduces a variable phase delay dependent on one or more electrical control signals generated by the electronic control unit 106 and are applied to the tunable phase delay block 108. The phase delay (variable phase delay) may be added to the modulated optical signal (S) or the LO in the optical domain, or to the demodulated complex (I,Q) signal in the electrical domain.

The phase delay produced by the phase delay block 108 monotonically varies with the input signal, at least in a predefined range. The phase delay block 108 may have at least one of a finite phase delay range or may be implemented in a manner that allows provision of an endless phase delay with time (referring to the phase delay used for applying a frequency offset).

In an exemplary embodiment, the finite phase delay range to be applied by the phase delay block 108 may be realized by using one of an electro-optic phase modulator or a thermo-optic phase modulator implemented as a discrete device or as a phase modulator implemented in a photonic integrated circuit (PIC).

In case of finite delay range to be applied, variable component of the phase delay added by the phase modulator may be approximated as $\phi_{out} = \pi V_{cont}/V_\square$. Here, $\phi_{out}$, $V_{cont}$, and $V_\square$ represent each of an added phase delay, an applied electrical control signal (generally a voltage signal) amplitude and an electrical control signal amplitude respectively, resulting in a phase shift of π radians.

The phase delay block 108 in the optical domain may also be implemented by using a thermo-optic phase shifter, in a case, when an amount of phase delay added by the phase delay block 108 changes monotonically with a temperature change in a waveguide, caused by tunable amount of heat generated by the control signal when the phase delay is applied to a heating element.

In an embodiment, implementation of the phase delay block 108 may also be implemented to add an endless phase delay (then phase delay block may be implemented as an endless phase delay element 108). In case of endless phase delay, the phase delay block may provide any amount of phase delay by one of increasing the phase delay or decreasing the phase delay over a predefined time period to get a desired amount of delay.

Figure 6:
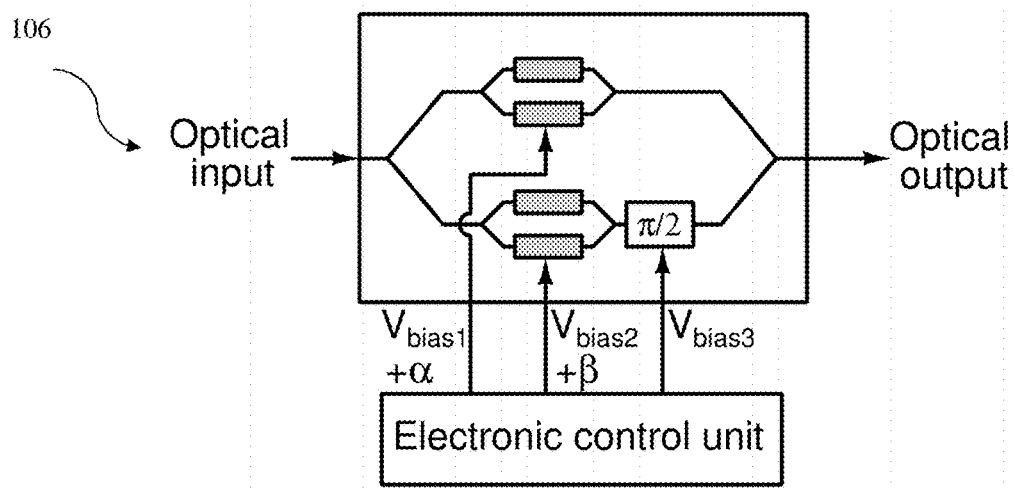
FIG. 6 shows architecture of phase delay block providing endless delay in the receiver using optical IQ modulator and control signals $V_{bias1}+\alpha$, $V_{bias2}+\beta$, and $V_{bias3}$, according to embodiments as disclosed herein.

FIG. 6 shows an embodiment of a tunable endless phase delay block providing endless phase delay in optical domain. In case of the endless phase delay, bias voltages $V_{bias1}$, $V_{bias2}$ and $V_{bias3}$ are applied from the electronic control unit to bias the optical IQ modulator (typically consisting of a nested Mach-Zehnder modulator) shown in the FIG. 6 in quadrature IQ modulator configuration.

In quadrature IQ modulator configuration, $V_{bias1}$ and $V_{bias2}$ are adjusted such that corresponding internal intensity modulators of the I-Q modulator are biased at null points (which means that the output power level of each of the internal individual intensity modulator is zero when the values of signal components α and β are zero), and the $V_{bias3}$ is adjusted to provide a relative phase delay of π/2 between the internal modulator outputs before coming the optical signals to obtain the final output from the modulator, as shown in the FIG. 6. Some of these IQ modulators may not require additional bias signals or may require fewer bias signals for these operations.

In some of these IQ modulators, the signal components α and β are added to each of $V_{bias1}$ and $V_{bias2}$ voltages to provide the desired phase delay. When the values of each of α and β are $\ll V_\pi$ each, the phase delay added (in radians) is equal to arctan(β/α). Here, $V_\pi$ is the bias voltage needed by the phase modulator for adding a phase delay of π radians. If the signals α and β are continuous time functions (derivatives of each of the α and β are defined for all time instants), the phase delay added by the phase delay block will also be a continuous function of time.

Figure 7:
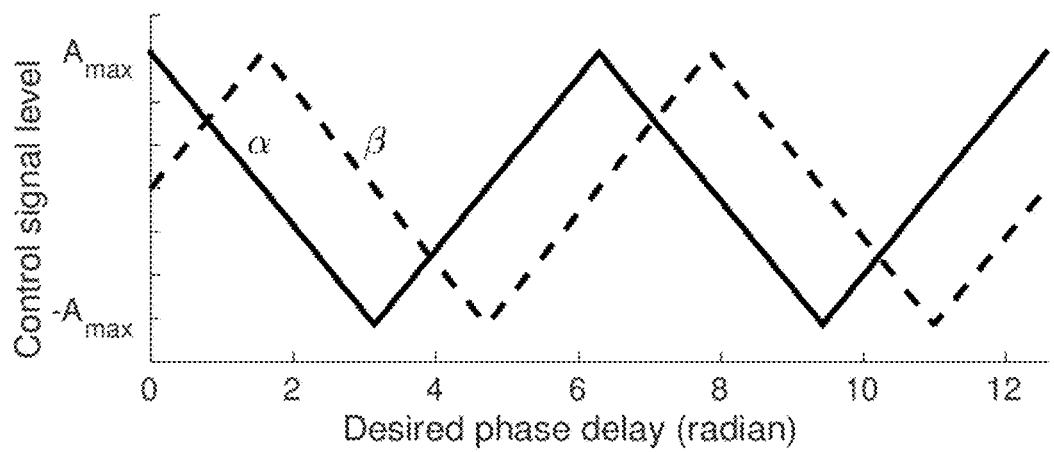
FIG. 7 shows control signals to the phase delay block providing endless phase delay, according to embodiments as disclosed herein.

FIG. 7 shows the values of α and β as a function of the desired phase delay, as an example. Therefore, according to FIG. 7, the phase delay may also go beyond π or 2π phase shift boundaries, and to any desired value, over a certain time period.

The optical domain tunable endless phase delay element described above can also be used in a variety of other independent applications, which may not be limited to the receivers of coherent optical communication links. For example, the tunable phase delay element may be used for adding tunable phase delays to the optical signals use in LiDAR applications for beam forming and beam steering by providing desired phase delays to optical signals. The tunable phase delay elements can also be used for optical phase locked loops and for interferometry and sensing applications.

In general, optical phase modulators are used for providing tunable optical phase delay. However, such modulators have a limited range over which the phase delay can be tuned. For example, the optical phase modulator, adds a phase delay that changes monotonically with respect to the applied electrical signal. Since the applied electrical signal cannot go beyond certain range, the tunable optical phase delay range gets limited by the maximum value of the electrical signal that can be applied. In case of the endless tunable optical phase delay element described here, the two signals α and β are varied together to overcome this limitation. In general, it is desired that the output intensity of the endless tunable optical phase delay element remains constant, irrespective of the amount of phase delay added by it. The values of α and β have to be chosen such that this requirement is satisfied. For example, when the optical IQ modulator is implemented using a nested Mach-Zehnder modulator shown in FIG. 6, the internal modulators are biased at null points and $V_{bias3}$ is applied to provide the desired phase shift of π/2 as described earlier, the output electric field has a dependence on α and β which is governed by the following expression: $\cos(\sin(\alpha\pi/V_\pi))+j\sin(\sin(\beta\pi/V_\pi))$.

Above expression is obtained under the condition that the phase shifts added by phase modulators inside the nested Mach-Zehnder modulator vary linearly with respect to the applied voltage. In this case, depending on the amount of phase delay needed, the α and β signals can be generated by an electronic circuitry. This circuitry can use lookup tables to generate the values of α and β, which are dependent on the desired phase delay, in addition to getting the desired output intensity from the tunable optical delay element. An example of the values of α and β with respect to the desired phase delay have been shown in FIG. 7, which will ensure constant optical intensity output is obtained when the nested Mach-Zehnder modulator is ideal.

The values provided by the lookup table with respect to the desired phase delay can also be calibrated to incorporate the effects of non-idealities in optical IQ modulator. The lookup table can be implemented using digital electronic circuitry. The electronic circuitry can also integrate the input signal to generate a signal that represents the desired phase delay. This signal may have jumps corresponding to jumps of 2π radians in phase. However, these jumps will not result in phase jumps in the phase delay added by the endless tunable optical phase delay element.

$f_{offset}$ is a frequency offset between the S signal and LO signal, the phase delay added by the block increases continuously with time, i.e. the tunable component of the phase delay becomes:

$$\phi_{out}=2\pi f_{offset}t$$

Alternatively, the added phase delay becomes unbounded or endless. The endless phase delay through the phase delay block 108 may help in covering a very wide range of phase delays, and may also be useful if there is no other tunable frequency offset correction mechanism. In the above-mentioned example, the endless phase delay through the phase delay block 108 provides a frequency shift by $f_{offset}$. When $f_{offset}$ is varying with time, the desired output phase for CPRC is given below:

$$\phi_{out}=\int 2\pi f_{offset}(t)dt$$

Where, $f_{offset}(t)$ is the frequency offset at time instant t. Therefore, the desired values of α and β as a function of time.

The endless phase delay may compensate for any amount phase offset and help in avoiding the loss of synchronization due to saturation of phase delay that may happen when a conventional phase delay block (i.e. the phase modulator-based phase delay block) is used.

Figure 8:
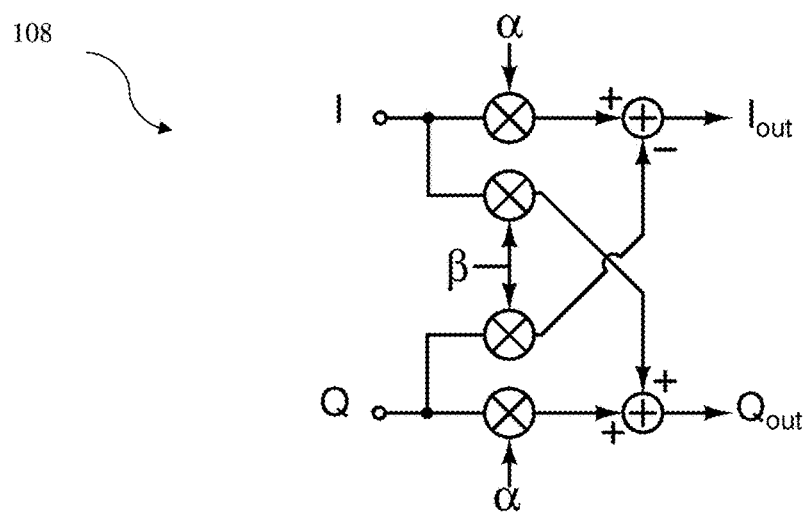
FIG. 8 shows implementation of the phase delay block providing endless phase delay in an electrical domain, according to embodiments as disclosed herein.

In an embodiment, FIG. 8 shows an endless phase delay using a single-sideband mixer in an electrical domain. Real in-phase signal (I) and quadrature phase signal (Q) may together be considered as a single complex signal I+jQ. The phase delay block 108 for providing endless phase delay may also be implemented in electrical domain, for adding a phase delay to the complex signal in electrical domain for carrier synchronization.

As shown in FIG. 8, in order to add the endless delay in the electrical domain, a single side-band (SSB) mixer can be used. The single sideband mixer is a complex multiplier configured to perform complex multiplication of input signal I+jQ with electronic control unit complex output α+jβ in order to produce a complex output signal $I_{out}+jQ_{out}$, where $I_{out}=I\alpha-Q\beta$ and $Q_{out}=Q\alpha+I\beta$.

Here complex output signal $I_{out}+jQ_{out}$ is the phase delayed version input complex I-Q signal (i.e. the complex signal I+jQ). The phase delay added is proportional to arctan(β/α). If the signals α and β are continuous time functions (i.e. their derivatives are defined for all time instants), the phase delay added by the phase delay block 108 will also be a continuous function of time.

FIG. 7 shows the values of α and β as a function of the desired phase delay. Therefore, as can be seen in the FIG. 7, the phase delay can go beyond π or 2π phase shift boundaries, and to any desired value, over a certain time period. Therefore, as discussed before, as in the case of the phase delay block 108 with optical IQ modulator based endless phase delay element, the phase delay block 108 in domain for providing endless phase delay may also provide an endless phase delay or a desired frequency shift.

In an embodiment, the receiver 100 also comprises a frequency shifting element 110 in order to compensate for frequency offset. For compensating the frequency offset between the carrier and LO lasers, tunable frequency shifting element 110 (or the frequency shifting element 110) is required. In one embodiment, the tunable frequency shifting element 110 is implemented by using the endless phase delay in one of the path of the S signal or path of the LO signal by using one of an optical IQ modulator, or using an SSB mixer in electrical domain, as discussed earlier. Therefore, the phase delay block 108 providing the endless phase delay element may also be treated as a frequency shifting element 110.

In case of any limitations in using the phase delay block 108 for shifting frequency, the use of tunable laser (may also be referred as the tunable aser 110) may be more beneficial to achieve the desired frequency shift. The tunable laser at the receiver 100 of the coherent optical link may act as the frequency shifting element 110. However, in this case, the frequency shift is provided directly to the reference optical carrier (i.e. the LO signal). The amount of frequency shift may be controlled by one or more signals coming out of the electronic control unit 106. The control signals may be at least one of analog in nature, and digital in nature. For example, the laser may have digitally controlled coarse frequency tunability and analog voltage controlled fine frequency tunability.

The frequency shifting element 110 can also be implemented using the tunable laser. The frequency shift of an analog signal controlled tunable laser may be controlled by varying the analog control signal generated from the electronic control unit. The frequency shift of the tunable laser can be varied monotonically at least over the frequency range of 10 MHz with respect to the analog control signal. The frequency shift of the digitally controlled tunable laser is tuned monotonically with respect to the digital control word generated by digital circuitry in the electronic control unit. By varying the digital control word monotonically, the frequency shift of at least of the range of 10 MHz can be achieved over a range of digital control word.

As discussed earlier, the electronic control unit 106 is configured to generate control signals for each of the phase delay block 108 and the frequency shifting element 110.

The electronic control unit 106 takes at least one of the phase error signal and the frequency error signal from the phase offset detection block 104 and generates and transmits the control signals (electrical signals) to at least one of the phase delay block 108 and frequency shifting element 110.

The electronic control unit 106 comprises of at least one of analog, digital and mixed signal circuitry to complete the feedback loop in the receiver 100. The electronic control unit 106 is designed to ensure that the feedback loop is stable and is able to track and compensate for at least one of the phase offset and the frequency offsets between the S signal and the LO signal.

The electronic control unit 106 in the analog domain may comprise passive circuit components such as resistors, capacitors and inductors. The electronic control unit 106 in the analog domain may also include some active circuit components such as circuits made using op-amps, comparators, current sources, charge-pumps and switches to implement integrators, differentiators and other signal conditioning circuits.

The values of the passive circuit components and the active circuit components may be designed to achieve a desired transfer function of the feedback loop to ensure that the feedback loop is stable and is able to track and compensate for at least one of the phase offset and the frequency offsets between the S signal and LO signal by adjusting the transfer function(s). The circuitry implementing the transfer function/characteristics of the electronic control unit 106 is also often termed as the loop filter.

The electronic control unit 106 may also use electronic circuitry developed in digital domain. In case of the digital domain, one or more analog signals or digitized signals coming from the phase offset detection block 104 are processed in the digital domain (i.e. using digital signal processing techniques that use synchronous and combinational logic circuits). The digital domain processing again effectively implements the loop filter in digital domain. The final output (from the electronic control unit 106) may be used directly to tune the phase delay provided by at least one the tunable phase delay block 108 and the frequency shift added by the tunable frequency shifting element 110.

One or more of the final output(s) may also be converted to analog domain using one or more digital-to-analog converters and provide to the tunable phase delay block 108 and/or tunable frequency shifting element 110.

The electronic control unit 106 may be able to generate the desired $\alpha$ and $\beta$ signals, as shown above in FIG. 7 using at least one of the analog circuitry or the digital circuitry, for example using look-up tables or numerically controlled oscillators. The output of the at least one of the analog circuitry and the digital depends on the desired phase delay (which is taken as an input signal).

In many cases, at least one of the phase delay and frequency shift added by the tunable phase delay block 108 and the frequency shifting element 110 may show a small or significant deviation from desired behavior causing distortion. The electronic control unit 106 may also be configured to compensate for the distortion, for example, by adding pre-adjusting input-to-output transfer characteristics using additional calibration mechanism.

The electronic control unit 106 may also be able to provide automatically adjustable bias(es) to the tunable phase delay block and/or frequency shifting element 110 to get acceptable transfer characteristics. For example, the bias voltages provided to the optical IQ modulator shown in FIG. 6 may be adjusted automatically by the electronic control unit using automatic bias control techniques, to achieve the desired input signal vs. resultant phase delay characteristics.

In addition, to reduce losses in the optical IQ modulator based phase shifter, the amplitudes of $\alpha$ and $\beta$ signals may have to be increased, which changes the phase delay characteristics and adds amplitude variations in the optical IQ modulator output intensity. The look-up tables may be used to obtain modified $\alpha$ and $\beta$ values, to achieve the desired phase delay characteristics overall and a constant intensity output from the tunable phase delay block.

Still referring to FIG. 3 and FIG. 4 in combination, the proposed receiver 100 and the method 400 uses the tunable phase delay block 108 in the receiver 100 in one or more feedback configurations to compensate for fast variations in the phase offsets. The tunable laser at the receiver 100 is used as the frequency shifting element 110 in addition to a phase delay block 108 before the reference optical carrier (LO) input to the 90° optical hybrid 102, to adjust the frequency shift and add adjustable phase delay (also referred as phase delay) in the optical domain.

In another embodiments, the tunable phase delay may be added in the electrical domain. In the proposed receiver 100 and the method 400, the tunable laser (additional) may be also used to tune out the frequency offset and accumulated phase offsets.

In an exemplary embodiment, as discussed above, FIG. 9 shows carrier phase recovery and compensation using the phase delay block 108 in the reference optical carrier's path and O/E converter 112 is also shown in each of the FIG. 9 to FIG. 19.

Figure 10:
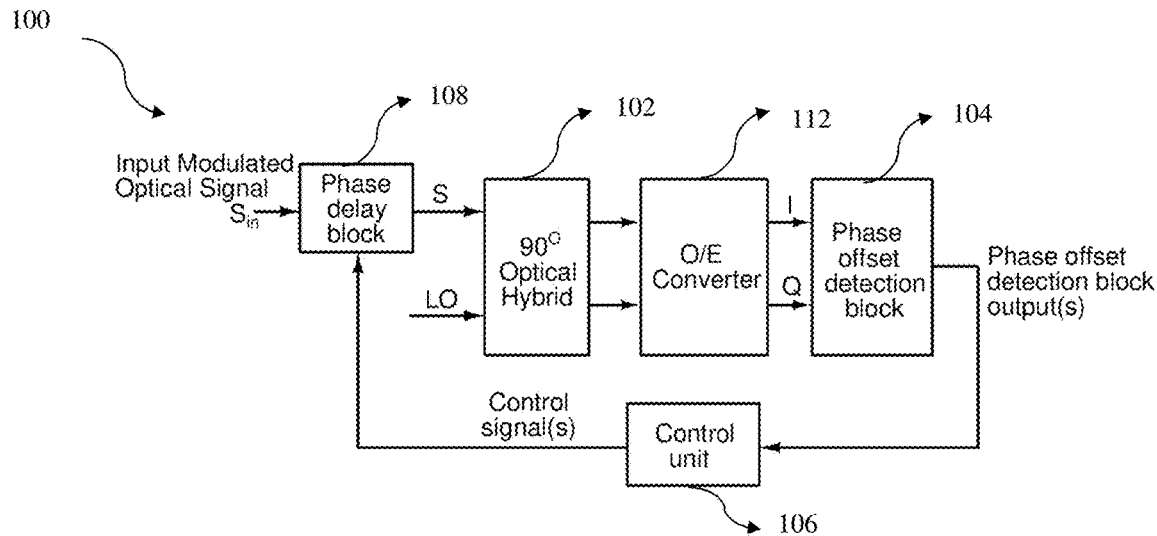
FIG. 10 shows carrier phase recovery and compensation using phase delay block in modulated optical signal's path, according to embodiments as disclosed herein.

In an exemplary embodiment, FIG. 10 shows carrier phase recovery and compensation using the phase delay block 108 in modulated optical signal's path.

Figure 11:
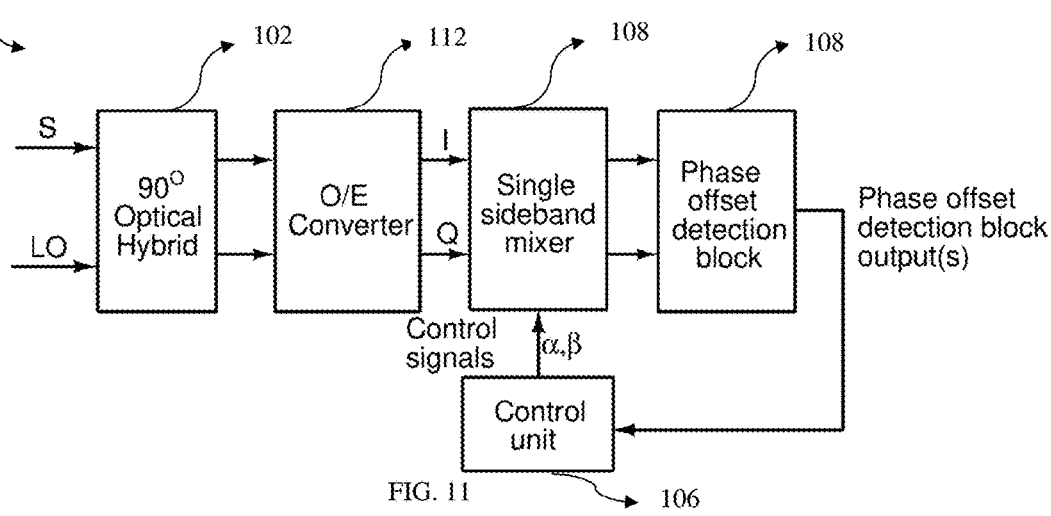
FIG. 11 shows carrier phase synchronization module with phase delay block using single sideband mixer in the electrical domain, according to embodiments as disclosed herein.

In another exemplary embodiment, FIG. 11 shows carrier phase synchronization module with the phase delay block 108 using single sideband mixer in the electrical domain.

Figure 9:
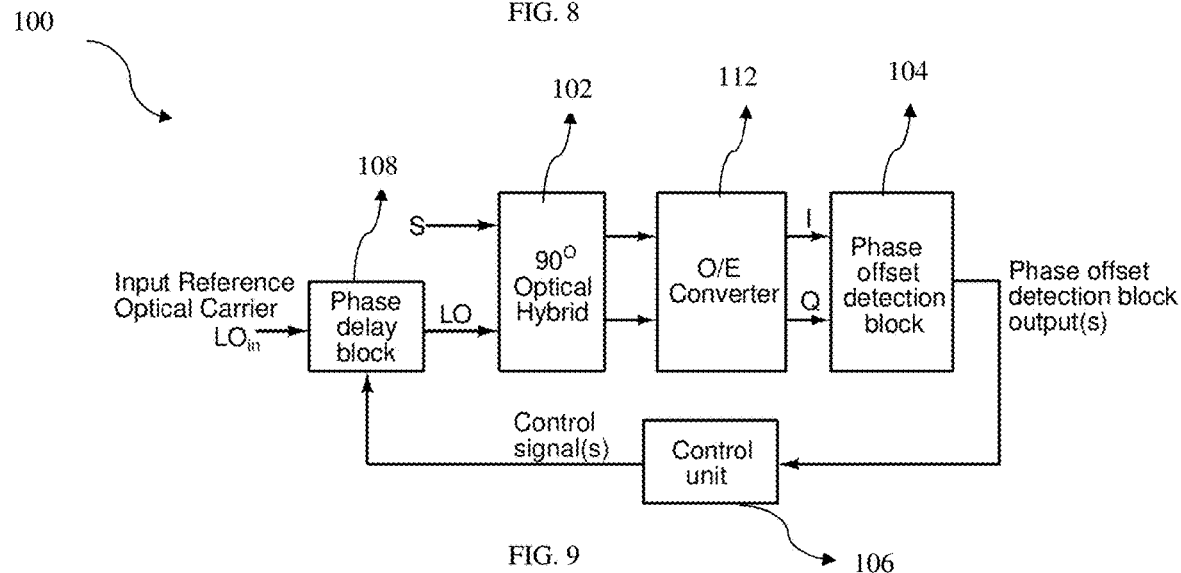
FIG. 9 shows carrier phase recovery and compensation using phase delay block in the reference optical carrier's path, according to embodiments as disclosed herein.

Each of the FIG. 9, FIG. 10 and FIG. 11 represent alternate embodiments of the proposed receiver 100 and the proposed method 400 to achieve carrier phase recovery and compensation in systems where the signal S and the signal LO are derived from a common optical source (or laser). Examples of system comprise one of a self-coherent system or a self-homodyne system. For compensating the phase offset in the system, the optical phase delay block is introduced in the path of at least one of the reference optical carrier signal and the modulated optical signal. The phase delay may also be introduced in the electrical domain in the complex demodulated signal (I+jQ) using the single sideband mixer as shown in FIG. 11.

In another exemplary embodiment, when the signal LO and the signal S are derived from an independent optical (or laser) sources, then nominal (or average) frequencies of the signal LO and the signal S may have a small difference or offset ($f_{offset}$), even if intended design for the signal LO and the signal S is to provide similar nominal frequency. Using the frequency shifting element, the $f_{offset}$ may be nullified, so that signal S and the signal LO are frequency synchronized. One or more feedback signals from the electronic control unit 106 may then be provided to the frequency shifting element 110 to get desired frequency shift.

Figure 12:
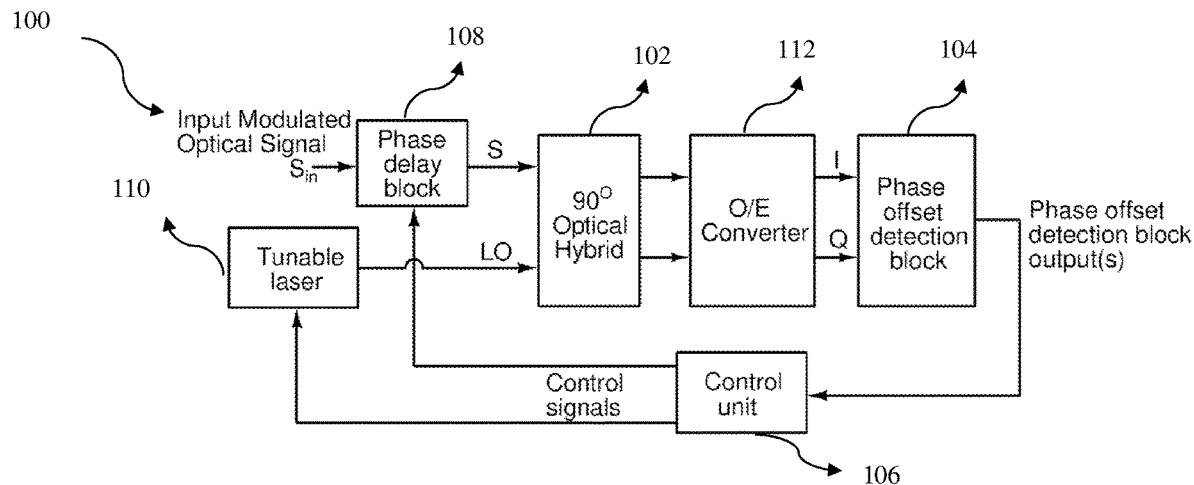
FIG. 12 shows carrier phase recovery and compensation with tunable laser in reference optical carrier's path that acts as frequency shifting element and phase delay block in modulated optical signal's path, according to embodiments as disclosed herein.

In another exemplary embodiment, FIG. 3 shows carrier phase recovery and compensation with tunable laser and the phase delay block 108 in reference optical carrier's path. FIG. 12 shows carrier phase recovery and compensation with tunable laser in reference optical carrier's path acting as the frequency shifting element 110 and the phase delay block 108 in modulated optical signal's path.

Figure 13:
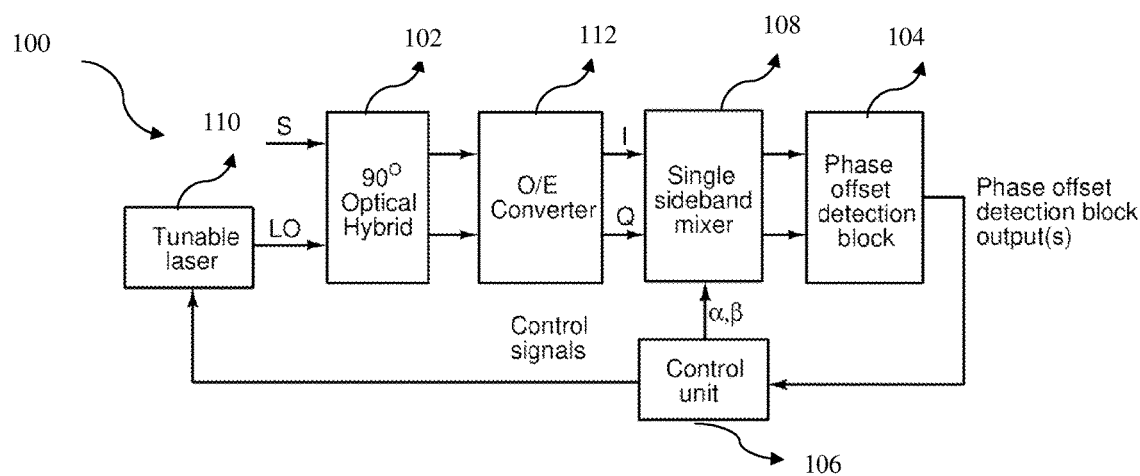
FIG. 13 shows carrier phase recovery and compensation with phase delay block using single sideband mixer in the electrical domain and tunable laser in reference optical carrier's path, according to embodiments as disclosed herein.

In another exemplary embodiment, FIG. 13 shows carrier phase recovery and compensation with the phase delay block 108 using single sideband mixer in the electrical domain and tunable laser in reference optical carrier's path.

In systems using independent lasers at transmitter and the receiver, the laser at the receiver 100 is used to provide the reference optical carrier (LO). The laser may comprise a tunable laser, acting as the frequency shifting element 110. Tunable lasers may have a slow response time, and hence, an additional phase delay block 108 has to be added to compensate for fast changing phase offset.

In an exemplary embodiment, in the proposed receiver 100 and the method, as shown in FIG. 3, the laser at the receiver 100 is used as the frequency shifting element 110 in addition to a phase delay block 108 before the reference optical carrier (LO) input to the 90° optical hybrid 102.

In another embodiment, as shown in FIG. 12, the tunable laser is used as the frequency shifting element 110 and phase delay block 108 is added in the optical domain in the modulated optical signal (S) path.

In yet another embodiment, as shown in FIG. 13, the tunable laser is used as the frequency shifting element 110 in the feedback loop and the phase delay is added in the electrical domain in the feedback loop before the phase offset detection block 104.

Furthermore, in the coherent optical links using independent lasers at the transmitter and the receiver, instead of using a tunable laser at the receiver for shifting frequency, the frequency shifting element 110 may be introduced in at least one of the path of the S signal and path of the LO signal in the optical domain or before the phase offset detection block 104 in the electrical domain.

Figure 14:
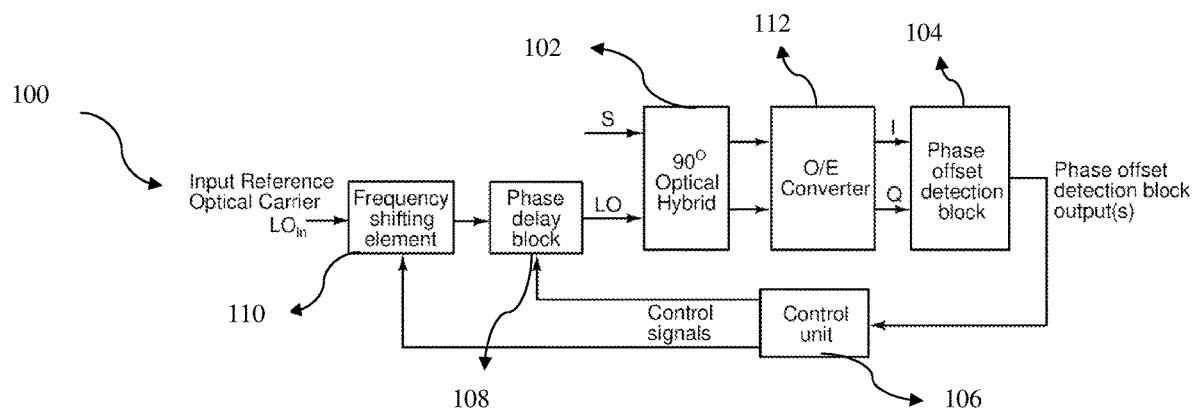
FIG. 14 shows carrier phase recovery and compensation with frequency shifting element and phase delay blocks in reference optical carrier's path, according to embodiments as disclosed herein.

In another exemplary embodiment, FIG. 14 shows carrier phase recovery and compensation with the frequency shifting element 110 and phase delay blocks 108 in reference optical carrier's path.

Figure 15:
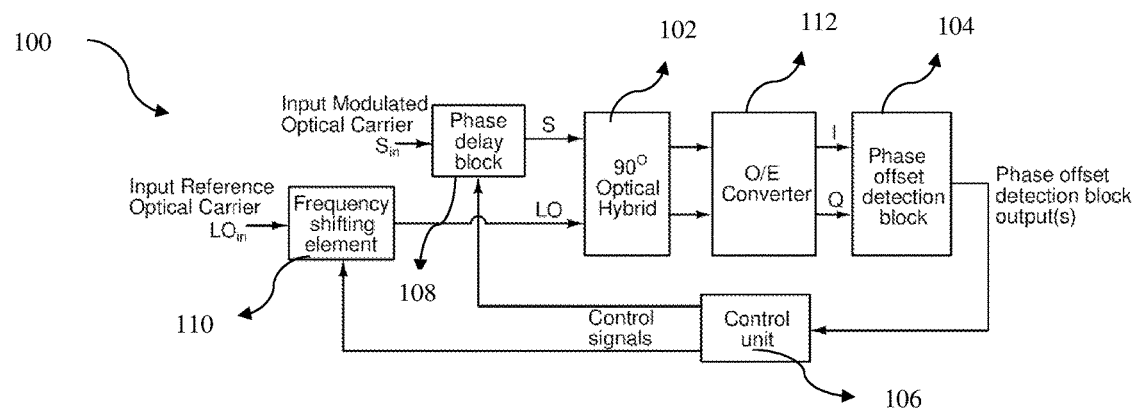
FIG. 15 carrier phase recovery and compensation with frequency shifting in reference optical carrier's path and phase delay block in modulated optical signal's path, according to embodiments as disclosed herein.

In another exemplary embodiment, FIG. 15 shows carrier phase recovery and compensation with the frequency shifting element 110 in reference optical carrier's path and phase delay block 108 in modulated optical signal's path.

Figure 16:
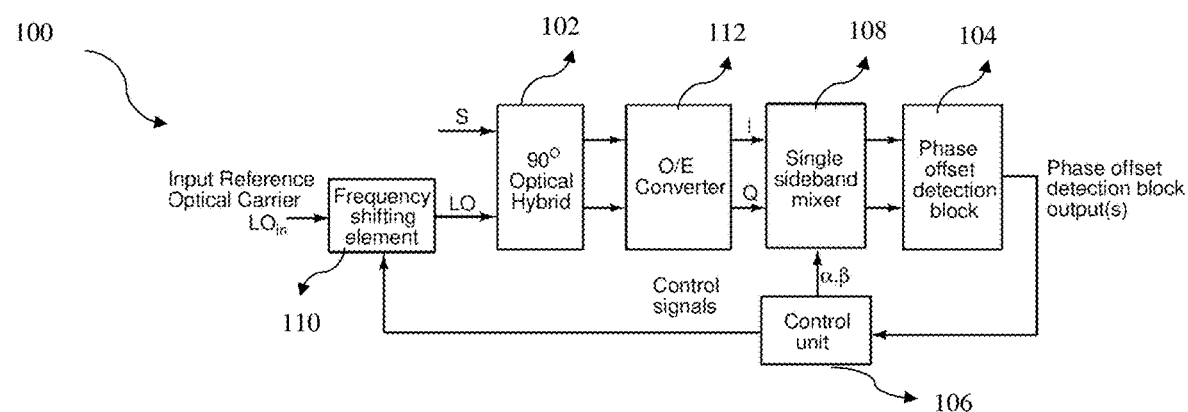
FIG. 16 shows carrier phase recovery and compensation with phase delay block using single sideband mixer in the electrical domain and frequency shifting element in reference optical carrier's path, according to embodiments as disclosed herein.

In another exemplary embodiment, FIG. 16 shows carrier phase recovery and compensation with the phase delay block 108 using single sideband mixer in the electrical domain and frequency shifting element 110 in reference optical carrier's path.

Figure 17:
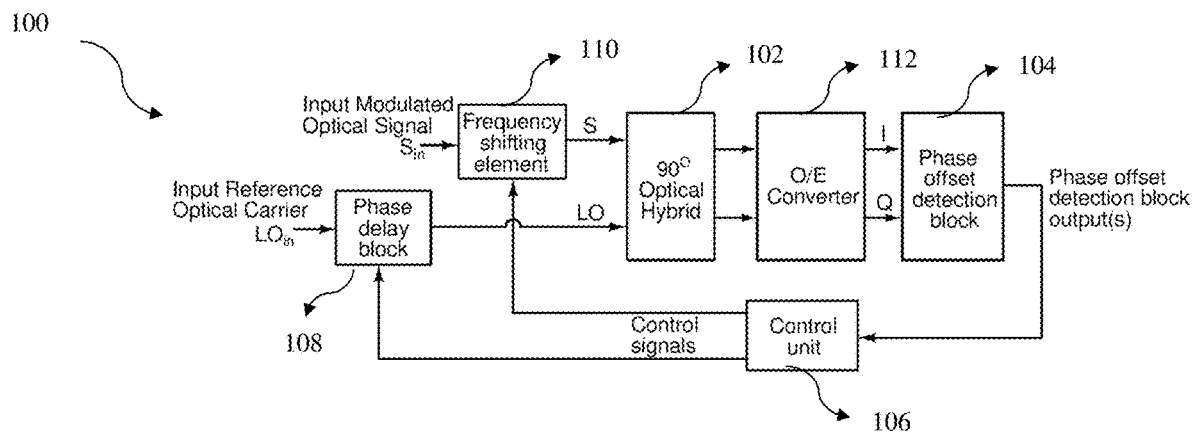
FIG. 17 shows carrier phase recovery and compensation with frequency shifting in modulated optical signal's path and phase delay block in the reference optical carrier's path, according to embodiments as disclosed herein.

In another exemplary embodiment, FIG. 17 shows carrier phase recovery and compensation with the frequency shifting element 110 in modulated optical signal's path and phase delay block 108 in the reference optical carrier's path.

Figure 18:
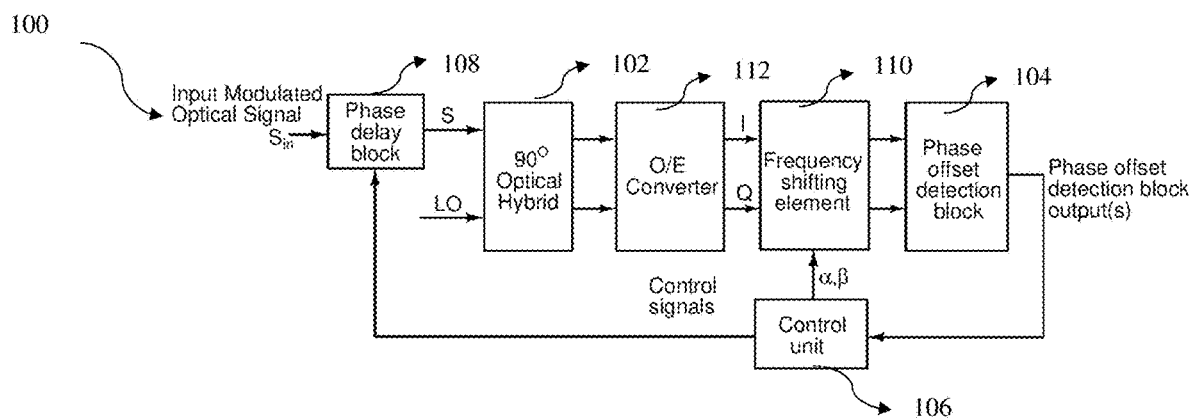
FIG. 18 shows carrier phase recovery and compensation with frequency shifting element in electrical domain and the phase delay block in modulated optical signal's path, according to embodiments as disclosed herein.

In another exemplary embodiment, FIG. 18 shows a carrier phase recovery and compensation with the frequency shifting element 110 in electrical domain and the phase delay block 108 in modulated optical signal's path In each of the embodiment implemented through the receiver 100 and the method 400, as shown in each of the FIG. 14, FIG. 15, FIG. 16, FIG. 17 and FIG. 18, each embodiment represents carrier phase recovery and compensation technique using the frequency shifting element 110 and the phase delay block 108.

The frequency shifting element 110 shifts the frequency of $LO_{in}$ so that $f_{offset}$ between the signal S and the signal LO tends to zero for achieving frequency synchronization between the signal S and the signal LO. The frequency of the tunable laser and the phase delay of phase delay blocks 108 are tuned by the control signals generated by electronic control unit 106.

In one of the embodiments as shown in FIG. 14, the frequency shifting element 110 is present in addition to the phase delay block 108 before the reference optical carrier (LO) is fed as the input to the 90° optical hybrid 102.

In another embodiment as shown in FIG. 15, the frequency shifting element 110 and the phase delay block 108 are added in the optical domain in the path of signal LO and the signal S.

In yet another embodiment as shown in FIG. 16, the frequency shifting element 110 is added in the optical domain in the LO path and the phase delay 108 is added before the phase offset detection block 104 in the electrical domain, in the feedback loop.

In another embodiment as shown in FIG. 17, the frequency shifting element 110 and the phase delay block 108 may be added in the optical domain in the path of the signal S and in the path of signal LO respectively, in order to achieve CPRC.

Figure 19:
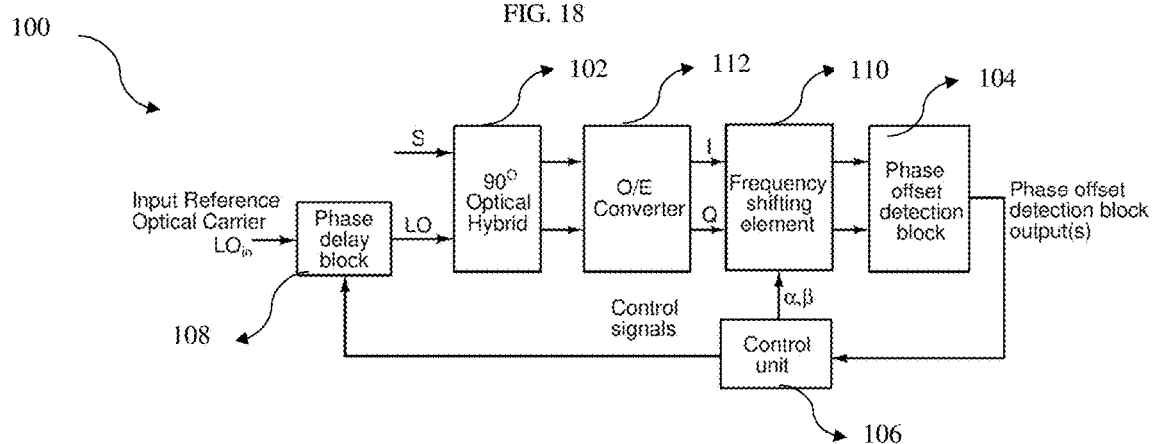
FIG. 19 shows carrier phase recovery and compensation with frequency shifting element in electrical domain and the phase delay block in reference optical carrier's path, according to embodiments as disclosed herein.

Embodiments as shown in each of the FIG. 18 and FIG. 19, illustrates that the frequency shifting element 110 may be introduced in the electrical domain before the phase offset detection block 104 and the phase delay can be kept in the S and LO paths respectively.

In accordance with an embodiment, the endless tunable phase delay element 108 (or tunable phase delay block providing endless delay) as discussed in FIG. 6 and FIG. 8, is further elaborated. In another exemplary embodiment, the endless tunable phase delay element 108 may be implemented in any hardware entity in addition to the receiver 100 discussed as an exemplary embodiment. The optical IQ modulator of the endless tunable delay element 108 is configured to receive an optical signal as an input and pass as an output, a modified optical signal, after adding an endless tunable phase delay to the optical input signal.

The optical IQ modulator receives at least two electrical control signals to control the endless tunable phase delay added by the optical IQ modulator. Each of the at least two electrical control signals are generated by the electronic circuitry (electronic control circuit 106) connected to the optical IQ modulator. The at least two electrical control signals are generated by using one or more lookup tables from one of an input signal received by the electronic circuitry 106 or an electrical signal obtained after integrating the input signal received by the electronic circuitry 106.

Figure 20:
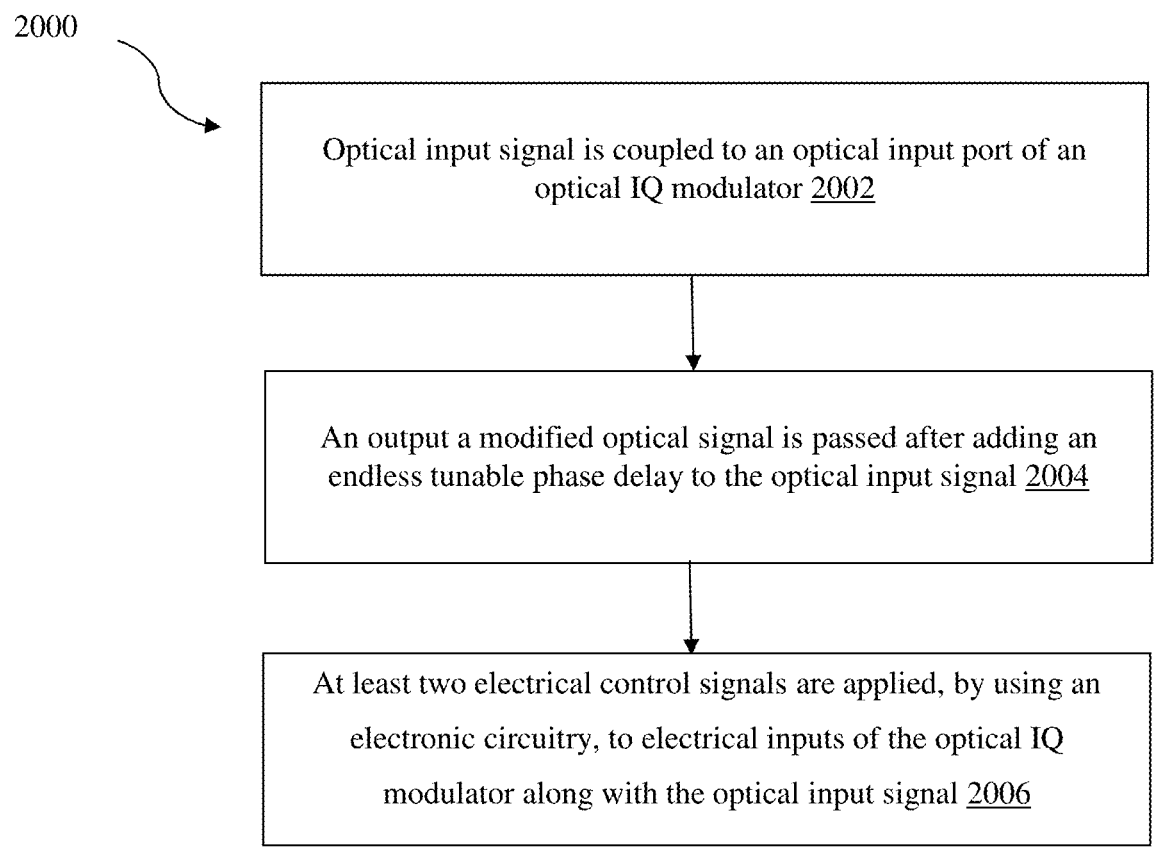
FIG. 20 shows method of adding an endless tunable phase delay to an optical signal, according to embodiments as disclosed herein.

In another exemplary embodiment, referring to FIG. 20, flow chart for a method 2000 of adding an endless tunable phase delay to an optical signal is shown. The method 2000 may be executed through the endless tunable phase delay element 108. The method 2000 at step 2002 provides coupling, the optical input signal to the optical input port of the optical IQ modulator. At step 2004, the method 2000 provides passing as the output the modified optical signal, after adding the endless tunable phase delay to the optical input signal. At step 2006, the method provide applying, by using the electronic circuitry 106, the at least two electrical control signals to electrical inputs of the optical IQ modulator along with the optical input signal. The at least two electrical control signals are generated by using one or more lookup tables from one of an input signal received by the electronic circuitry or an electrical signal obtained after integrating the input signal received by the electronic circuitry.

The proposed receiver 100, the method 400 and the method 2000 may result in very high-speed phase/frequency offset correction overall and may be used with lasers having low phase noise levels at the expense of slow laser tunability.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A receiver (100) of a coherent optical communication link, the receiver (100) comprising:
   a 90° optical hybrid (102) configured to receive as an input, a reference optical carrier (LO) signal and a modulated optical signal (S);
   an optical to electrical (O/E) converter configured to receive an output optical signal from the 90° optical hybrid and to convert the output optical signal to a complex demodulated electrical signal, wherein the complex demodulated electrical signal comprises the information indicative of message amplitude, message phase, and overall phase offset between the reference optical carrier (LO) signal and a modulated optical signal (S);
   a carrier phase offset detection block (104) configured to receive the complex demodulated electrical signal and to generate at least one output signal representing an average of the phase offset at the input of the carrier phase offset detection block;
   an electronic control unit (106) configured to receive the at least one output signal from the carrier phase offset detection block (104) for generating one or more control signals;
   a tunable phase delay block (108) configured to receive the one or more control signals from the electronic control unit;
   wherein each of the 90° optical hybrid (102), the O/E converter, the carrier phase offset detection block (104), the electronic control unit (106) and the tunable phase delay block (108) are configured in a first feedback loop, such that the one or more outputs of the carrier phase offset detection block (104) are used for tuning the phase delay of the tunable phase delay block (108) to achieve carrier phase synchronization by introducing a phase delay in at least one of an optical domain between the S signal and the LO signal or an electrical domain in complex demodulated signal (I+jQ).

2. The receiver as claimed in claim 1, comprising: a tunable frequency shifting element configured in a second feedback loop, for receiving the one or more control signals from the electronic control unit for providing a frequency shift in one or more of the reference optical carrier signal in optical domain, the modulated optical signal in optical domain or the complex demodulated signal (I+jQ) in the electrical domain.

3. The receiver as claimed in claim 2, wherein the tunable frequency shifting element comprises an analog signal controlled tunable laser with monotonically varying frequency over a frequency range of at least 10 MHz with respect to the input analog signal over a control signal range.

4. The receiver as claimed in claim 2, wherein the tunable frequency shifting element comprises a digitally controlled tunable laser with monotonically varying frequency over a frequency range of at least 10 MHz with respect to the input digital control word over a range of digital control word.

5. The receiver as claimed in claim 2, wherein the tunable frequency shifting element comprises an endless phase delay element that is realized using an optical IQ modulator to add frequency shift in the optical domain or using a single-sideband mixer to add the frequency shift in the electrical domain, the endless phase delay element comprising:
   the optical IQ modulator, configured to receive an optical signal as an input and pass as an output a modified optical signal, after adding an endless tunable phase delay to the optical input signal;
   wherein the optical IQ modulator receives at least two electrical control signals to control the endless tunable phase delay added by the optical IQ modulator;
   wherein each of the at least two electrical control signals are generated by an electronic circuitry (106) connected to the optical IQ modulator;
   wherein internal intensity modulators of the I-Q modulator are biased at null points.

6. The receiver as claimed in claim 1, wherein the carrier phase offset detection block is implemented using one or more photonic integrated circuit components.

7. The receiver as claimed in claim 1, wherein the carrier phase offset detection block is implemented as a cross-correlator based phase detector using one or more electronic components.

8. The receiver as claimed in claim 1, wherein the carrier phase offset detection block generates a first output, such that an average of the first output varies monotonically with respect to the average of the phase offset at the input of the carrier phase offset detection block, when the average of the phase offset is in a range of −0.1 radian to +0.1 radian, for digital modulation schemes, wherein the digital modulation schemes comprise one of M-PSK, and N-QAM, wherein the value M is one of 2, 4, 8 or 16 and the value of N is one of 4, 8, 16, 32 or 64.

9. The receiver as claimed in claim 1, wherein the carrier phase offset detection block generates a second output, wherein an average of the second output varies monotonically with respect to an average of a frequency offset at the input of the carrier phase offset detection block when the frequency offset is in a range of −10 MHz to +10 MHz.

10. The receiver as claimed in claim 1, wherein the tunable phase delay block is realized using an electro-optic phase modulator.

11. The receiver as claimed in claim 1, wherein the tunable phase delay block is realized as an endless tunable phase delay element.

12. The receiver as claimed in claim 11, wherein the endless tunable phase delay element adds phase delay in the optical domain using an optical IQ modulator.

13. The receiver as claimed in claim 11, wherein the endless tunable phase delay element adds phase delay in the electrical domain by using a single-sideband mixer.

14. The receiver as claimed in claim 1, wherein the electronic control unit comprises analog circuit components comprising one or more of a capacitor, a resistor, an inductor, an integrator, a differentiator, a current source, a charge pump and a switch.

15. The receiver as claimed in claim 1, wherein the electronic control unit comprises digital circuitry to process the one or more input signals in digital domain and generate digital control words to be converted to analog control signals by using digital-to-analog converters, wherein the analog control signals are passed as the control signals to at least one of the tunable phase delay block and the tunable frequency shifting element.

16. The receiver as claimed in claim 1, wherein the electronic control unit comprises a calibration mechanism to adjust the one or more control signals generated by the control unit to compensate for distortion in phase delay characteristics of the phase delay block.

17. A method (400) of compensating for a carrier phase offset in a receiver (100) of a coherent optical communication link, the method (400) comprising:
    receiving, at a 90° optical hybrid (102), an input of each of a reference optical carrier (LO) signal and a modulated optical signal (S);
    receiving, by an optical to electrical (O/E) converter, an output optical signal from the 90° optical hybrid;
    converting, by the O/E converter, the output optical signal to a complex demodulated electrical signal, wherein the complex demodulated electrical signal comprises the information indicative of message amplitude, message phase, and overall phase offset between the reference optical carrier (LO) signal and a modulated optical signal (S);
    receiving, by a carrier phase offset detection block (104), the complex demodulated signal;
    generating, through a carrier phase offset detection block (104), at least one output representing an average phase offset at the input of the carrier phase offset detection block (104);
    receiving, through an electronic control unit (106), the one or more output signals from the carrier phase offset detection block (104) for generating one or more control signals;
    receiving, at a tunable phase delay block (108), the one or more control signals from the electronic control unit (106);
    wherein each of the 90° optical hybrid (102), the O/E converter, the carrier phase offset detection block (104), the electronic control unit (106) and the tunable phase delay block (108) are configured in a feedback loop, such that one or more outputs of the carrier phase offset detection block (104) are used for tuning the phase delay of the tunable phase delay block (108) to achieve carrier phase synchronization.

18. An endless tunable phase delay element (108), comprising:
    an optical IQ modulator, configured to receive an optical signal as an input and pass as an output a modified optical signal, after adding an endless tunable phase delay to the optical input signal;
    wherein the optical IQ modulator is a nested Mach Zehnder modulator;
    wherein the optical IQ modulator receives at least two electrical control signals to control the endless tunable phase delay added by the optical IQ modulator;
    wherein each of the at least two electrical control signals are generated by an electronic circuitry (106) connected to the optical IQ modulator;
    wherein internal intensity modulators of the I-Q modulator are biased at null points;
    wherein the at least two electrical control signals to the IQ modulator are chosen so as to provide a $\pi/2$ phase shift between the internal optical intensity modulator outputs;
    wherein the electrical control signals to the IQ modulator are chosen so as to provide a constant optical intensity output from the IQ modulator; and
    wherein the at least two electrical control signals are generated by using one or more lookup tables from one of an input signal received by the electronic circuitry (106) or an electrical signal obtained after integrating the input signal received by the electronic circuitry.

19. A method (2000) of adding an endless tunable phase delay to an optical signal, the method (2000) comprising:
    coupling, an optical input signal to an optical input port of an optical IQ modulator,
    passing as an output a modified optical signal, after adding an endless tunable phase delay to the optical input signal,
    applying, by using an electronic circuitry (106), at least two bias voltages and at least two electrical control signals to electrical inputs of the optical IQ modulator along with the optical input signal;
    wherein the at least two electrical control signals are generated by using one or more lookup tables from one of an input signal received by the electronic circuitry (106) or an electrical signal obtained after integrating the input signal received by the electronic circuitry and
    wherein internal intensity modulators of the I-Q modulator are biased at null points.

* * * * *